United States Patent [19]

Eagles

[11] 4,381,995

[45] May 3, 1983

[54] IN-LINE FILTER AND FLOW CONTROL VALVE

[75] Inventor: Derek M. Eagles, Hudson, Iowa

[73] Assignee: Deere & Company, Moline, Ill.

[21] Appl. No.: 301,164

[22] Filed: Sep. 11, 1981

[51] Int. Cl.³ ............................................. B01D 35/02
[52] U.S. Cl. .................................... 210/137; 137/541; 210/432; 210/446
[58] Field of Search ................. 210/97, 137, 354, 432, 210/446; 137/541

[56] References Cited

U.S. PATENT DOCUMENTS

| 2,184,761 | 12/1939 | Wier | 210/446 |
| 3,516,540 | 6/1970 | Landree et al. | 210/137 |
| 4,129,144 | 12/1978 | Andersson et al. | 137/541 |

FOREIGN PATENT DOCUMENTS 1136817  5/1957  France ............................. 210/446

*Primary Examiner*—John Adee

[57] ABSTRACT

An in-line filter element is disposed within a tubular valve spool which shifts to either meter or shut-off fluid flow through the valve in response to a preselected pressure differential across the valve and element which is some value below a value which could result in damage to the filter element.

4 Claims, 3 Drawing Figures

IN-LINE FILTER AND FLOW CONTROL VALVE

BACKGROUND OF THE INVENTION

The present invention relates to filters for filtering contaminants from hydraulic fluid and more specifically relates to in-line filters.

When filters are subjected to relatively large pressure drops across their filtering elements, the latter may become damaged. One way of protecting these elements from damage has been to use pressure responsive valves for bypassing fluid around the filter elements in response to the pressure drop across the elements reaching an undesirable level. These protective devices are often remote from the filter elements and accordingly require additional lines for carrying the bypassed fluid. Also, these devices have the undersirable characteristic of bypassing unfiltered fluid to the function part of the hydraulic system.

SUMMARY OF THE INVENTION

According to the present invention, there is provided a novel hydraulic fluid filter, and more particularly there is provided an in-line filter associated with a protective device for preventing undesirable levels of pressure drops from occurring thereacross.

An object of the invention is to provide an in-line filter which is installed so as to prevent it from being subjected to excessive pressure drops without allowing unfiltered fluid from flowing beyond the filter.

A more specific object is to provide an in-line filter wherein the filter element is incorporated in a flow control valve for preventing excessive pressure differentials from occurring across the element.

These and other objects will become apparent from a reading of the following description together with the appended drawing.

DESCRIPTION OF THE PREFERRED EMBODIMENT

Figure 1:
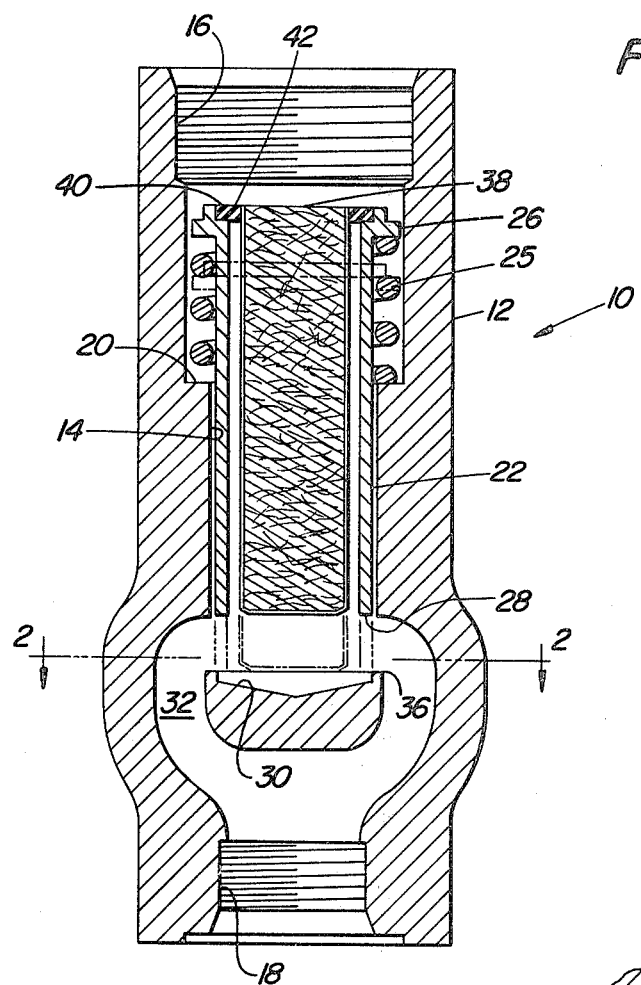
FIG. 1 is a longitudinal sectional view showing an in-line filter installation made in accordance with the present invention.
Figure 2:
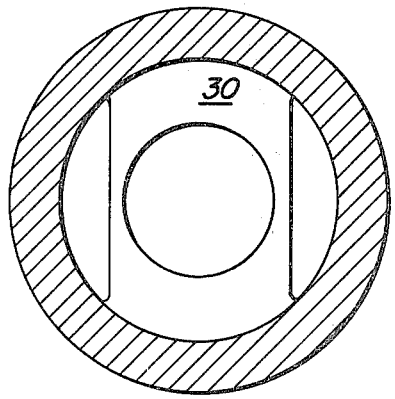
FIG. 2 is a view taken along line 2—2 of FIG. 1 and showing the valve spool seat.

Referring now to FIGS. 1 and 2, therein is shown an in-line filter assembly 10. The filter assembly 10 includes a tubular filter housing 12 defining a bore 14 having an upper end which serves as an inlet 16 and a lower end which serves as an outlet 18. The bore 14 has an enlarged upper section which joins a central section of the bore at an upwardly facing annular shoulder 20.

A tubular valve spool 22 is reciprocably mounted in the central section of the bore 14 and has an outturned annular flange 26 located in the enlarged upper section of the bore 14. A coil compression spring 25 is mounted between the flange 26 and the shoulder 20 and normally holds a lower end surface 28 of the spool 22 in vertical spaced relationship to a valve seat 30 formed integrally with the housing wall and located in a bulbous cavity 32 formed by a lower section of the bore 14. The seat 30 defines an upright annular lip 36 which cooperates with the lower end surface 28 of the spool 22 to meter the flow of fluid through the spool as the lower end of the spool approaches the seat.

Located within the spool 22 is a filter element 38 having an annular sealing ring 40 engaged with an annular seat 42 formed on the upper surface of the spool flange 26. The filter element 38 has a length which is approximately the same as that of the spool.

Thus, it will be appreciated that when the pressure drop across the spool 22 and filter element 38 is sufficient to overcome the resistance of the spring 25, the spool and element will shift downwardly as a unit until the flow through the valve becomes metered between the spool end 28 and seat lip 36.

Figure 3:
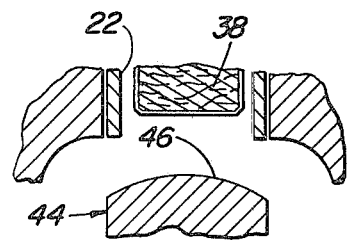
FIG. 3 is a view similar to FIG. 2 but showing a modified valve spool seat.

Referring nowtn FIG. 3, therein is shown a valve seat 44 having an upwardly curved surface 46 located for sealed engagement with the lower end of the valve spool 22 when the latter shifts to a location corresponding to a maximum desired pressure drop across the valve spool. Thus, no metering takes place.

I claim:

1. An in-line filter assembly comprising: a filter housing defining a valve bore having an inlet at one end, an outlet at another end and an intermediate section between said one and another ends; a tubular valve element reciprocably mounted in the reduced diameter section of the bore; a filter element mounted in the valve element for intercepting all of the flow occurring between the inlet and the outlet; said filter housing defining a valve seat located between said outlet and said valve element; said valve element having a downstream end adapted for movement toward said valve seat for controlling the flow of fluid from the inlet to the outlet to at least restrict said flow when a predetermined pressure differential exists across the valve and filter elements; and yieldable biasing means acting between the housing and the valve element in a direction holding the valve element away from said seat.

2. The in-line filter assembly defined in claim 1 wherein said valve bore includes an enlarged section adjacent said inlet; an annular shoulder joining said enlarged and intermediate sections and facing toward said inlet; said valve element including an annular flange at its upstream end; and said yieldable biasing means comprising a coil compression spring located between the shoulder and flange.

3. The in-line filter assembly defined in claim 2 wherein the filter element has an end sealingly engaged with the flange at a side thereof opposite from a side engaged by the spring.

4. The in-line filter assembly defined in claim 1 wherein said bore includes a bulbous section adjacent said outlet; and said valve seat extending crosswise in a central portion of the bulbous section.

* * * * *